(12) United States Patent
Chen et al.

(10) Patent No.: US 8,599,385 B2
(45) Date of Patent: Dec. 3, 2013

(54) MEASURING DISTRIBUTED POLARIZATION CROSSTALK IN POLARIZATION MAINTAINING FIBER AND OPTICAL BIREFRINGENT MATERIAL

(75) Inventors: Xiaojun Chen, San Gabriel, CA (US); Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 549 days.

(21) Appl. No.: 12/780,593

(22) Filed: May 14, 2010

(65) Prior Publication Data
US 2011/0277552 A1 Nov. 17, 2011

(51) Int. Cl.
*G01B 9/02* (2006.01)

(52) U.S. Cl.
USPC .......................... 356/491; 356/477

(58) Field of Classification Search
USPC ........................ 356/477, 491, 73.1
See application file for complete search history.

(56) References Cited

U.S. PATENT DOCUMENTS

| | | | | | |
|---|---|---|---|---|---|
| 5,064,270 A | * | 11/1991 | Turpin et al. | ..................... | 385/13 |
| 5,206,924 A | * | 4/1993 | Kersey | ............................. | 385/24 |
| 5,712,704 A | * | 1/1998 | Martin et al. | .................. | 356/491 |
| 7,227,645 B2 | * | 6/2007 | Cyr | ................................ | 356/491 |
| 7,920,253 B2 | | 4/2011 | Cyr et al. | | |
| 2006/0081772 A1 | * | 4/2006 | Williams et al. | ......... | 250/227.14 |

OTHER PUBLICATIONS

Cyr, N., et al., "Random-scrambling tunable POTDR for distributed measurement of cumulative PMD," Journal of Lightwave Technology, 27(18):4164-4174, Sep. 2009.
Faustini, L., et al., "Bend loss in single-mode fibers," Journal of Lightwave Technology, 15(4):671-679, Apr. 1997.
Gardner, W.B., et al., "Microbending loss in optical fibers," The Bell System Technical Journal, 54(2):457-465 Feb. 1975.
Li, M.J., et al., "Ultra-low bending loss single-mode fiber for FTTH," Journal of Lightwave Technology, 27(3):376-382, Feb. 2009.
Sunnerud, H., et al., "Measurement of polarization mode dispersion accumulation along installed optical fibers," IEEE Photonics Technology Letters, 11(7):860-862, Jul. 1999.
Ulrich, R., et al., "Bending-induced birefringence in single-mode fibers," Optics Letters, 5(6):273-275, Jun. 1980.
Wang, Q., et al, "Theoretical and experimental investigations of macro-bend losses for standard single mode fibers," Optics Express, 13(12):4476-4484, Jun. 2005.
Zendenhnam, A., et al., "Investigation of bending loss in a single-mode optical fiber," PRAMANA—Journal of Physics, 74(4):591-603, Apr. 2010.

* cited by examiner

*Primary Examiner* — Tarifur Chowdhury
*Assistant Examiner* — Jonathan Hansen
(74) *Attorney, Agent, or Firm* — Perkins Coie LLP

(57) ABSTRACT

Techniques and devices for measuring the distribution of polarization crosstalk in birefringence optical media including polarization maintaining fiber based on suppressing the number and magnitude of ghost interference peaks.

26 Claims, 10 Drawing Sheets

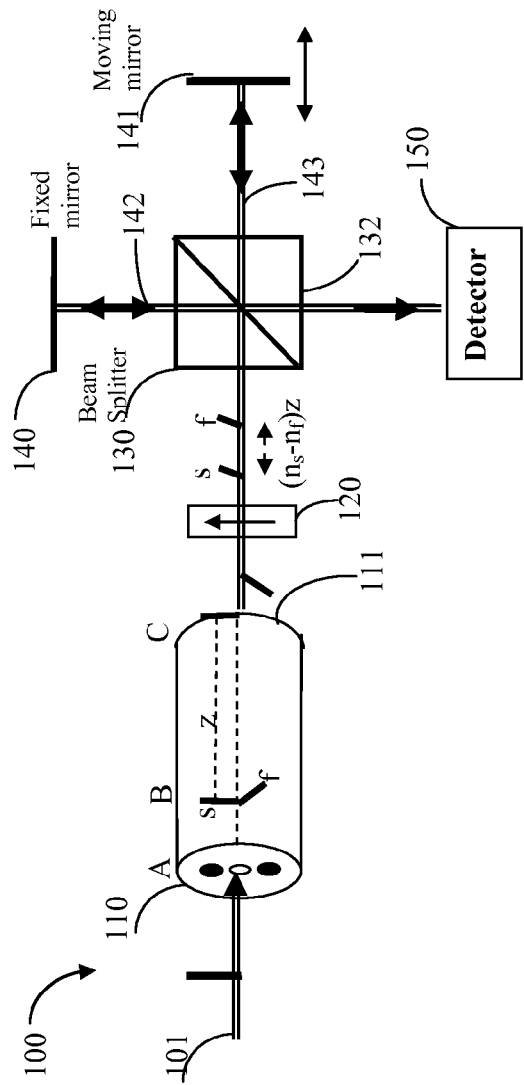
Fig. 1A
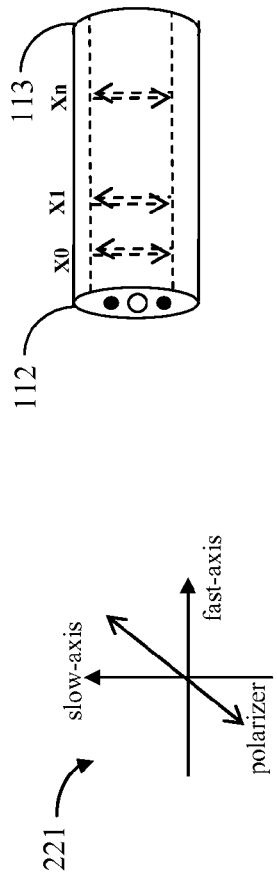
Fig. 1B
Fig. 1C

MEASURING DISTRIBUTED POLARIZATION CROSSTALK IN POLARIZATION MAINTAINING FIBER AND OPTICAL BIREFRINGENT MATERIAL

BACKGROUND

This patent document relates to devices, systems and techniques for measuring optical polarization property in optical materials and devices.

Optical polarization is an important parameter of an optical signal in various optical devices, systems and applications. The optical polarization of an optical signal can change or can be altered by interacting with an optical medium having optical birefringence in which light experiences different refractive indices at different optical polarizations. Fibers, for example, may be optically birefringent and light propagating in such fibers can change its polarization. The birefringence of a fiber may change with time, often randomly with the fluctuations in the operating conditions such as stresses or temperatures in the fiber.

Polarization maintaining (PM) fiber has high birefringence and supports two discrete polarization modes, $HE^{Slow}_{11}$ and $HE^{fast}_{11}$, that are along mutually orthogonal slow and fast axes of the PM fiber. The refractive index of the PM fiber for light polarized along the slow axis in the mode $HE^{Slow}_{11}$ is higher than the refractive index of the PM fiber for light polarized along the fast axis in the mode $HE^{fast}_{11}$. When the light coupled into the PM fiber is linearly polarized along the slow axis of the PM fiber, only $HE^{Slow}_{11}$ mode is excited and the optical polarization of the guided light is maintained along the slow axis; conversely, when the light coupled into the PM fiber is linearly polarized along the fast axis of the PM fiber, only $HE^{fast}_{11}$ mode is excited and the optical polarization of the guided light is maintained along the fast axis. This characteristics of preserving optical polarization in the PM fiber can be used in various applications, such as fiber optic gyroscopes, integrated optics devices, high-performance interferometer and Polari metric sensors, quantum key distribution, and fiber lasers. Perturbations to PM fiber, such as stresses exerted on PM fiber, may cause optical coupling or crosstalk between the two orthogonal polarization modes where optical energy of one polarization mode transfers to optical energy of another polarization mode or vice versa.

SUMMARY

This document includes techniques and devices for measuring the distribution of polarization crosstalk in birefringence optical media including polarization maintaining fiber based on suppressing the number and magnitude of ghost interference peaks.

In one aspect, a method is provided for measuring distribution of polarization coupling in an optical birefringent medium. This method includes coupling a linearly polarized light of a broadband spectrum into an optical birefringent medium in a direction along which the optical birefringent medium supports two orthogonal polarization modes due to optical birefringence to produce an optical output signal out of the optical birefringent medium; directing the optical output signal out of the optical birefringent medium into an optical delay device which causes an added optical delay greater than an optical delay between the two orthogonal polarization modes caused by the optical birefringent medium in the optical output signal to produce a modified optical output signal; directing modified optical output signal to transmit through a linear optical polarizer which is polarized in a direction to cause a mixing between the two orthogonal polarization modes in optical transmission light of the linear optical polarizer; directing the optical transmission light of the linear optical polarizer into an optical interferometer to obtain optical interference of light between the two orthogonal polarization modes in the optical birefringent medium; and processing the obtained optical interference to identify locations of the polarization coupling between the two orthogonal polarization modes in the optical birefringent medium.

In another aspect, a device is provided for measuring distribution of polarization coupling in an optical birefringent medium. This device includes a mechanism that couples a linearly polarized light of a broadband spectrum into an optical birefringent medium in a direction along which the optical birefringent medium supports two orthogonal polarization modes due to optical birefringence to produce an optical output signal out of the optical birefringent medium; and an optical delay device located downstream from the optical birefringent medium in an optical path of the optical output signal out of the optical birefringent medium to produce a modified optical output signal. The optical delay device is structured to cause an added optical delay greater than an optical delay between the two orthogonal polarization modes caused by the optical birefringent medium in the optical output signal to produce the modified optical output signal. This device includes a linear optical polarizer which is polarized in a direction to cause a mixing between the two orthogonal polarization modes in optical transmission light of the linear optical polarizer, the linear optical polarizer placed in an optical path of the modified optical output signal to produce the optical transmission light; an optical interferometer located to receive the optical transmission light of the linear optical polarizer and structured to obtain optical interference of light between the two orthogonal polarization modes in the optical birefringent medium; and a processing device that processes the obtained optical interference to identify locations of the polarization coupling between the two orthogonal polarization modes in the optical birefringent medium. The processing device can also be configured to process the obtained optical interference to obtain magnitudes of the polarization coupling at the identified locations.

In another aspect, a device is provided for measuring distribution of polarization coupling in an optical birefringent medium and includes a light source that produces a light beam of a broad spectral band; a mechanism that couples light of the light beam in a linear polarization into an optical birefringent medium in a direction along which the optical birefringent medium supports two orthogonal polarization modes due to optical birefringence to produce an optical output signal out of the optical birefringent medium; a linear optical polarizer which is polarized in a direction to cause a mixing between the two orthogonal polarization modes in optical transmission light of the linear optical polarizer, the linear optical polarizer placed in an optical path of the optical output signal of the optical birefringent medium to produce the optical transmission light; an optical interferometer made of fiber components and located to receive the optical transmission light of the linear optical polarizer and structured to obtain optical interference of light between the two orthogonal polarization modes in the optical birefringent medium; an optical detector that receives optical output of the optical interferometer and produces a detector output having information of the obtained optical interference; and a processing device that processes the obtained optical interference to identify locations of the polarization coupling between the two orthogonal polarization modes in the optical birefringent medium.

In another aspect, an apparatus described includes a broadband light source polarized linearly along the axis of PM fiber under test; an optical input port to receive input optical signal from the output of PM fiber under test; a delay device to generate additional optical delay between two orthogonal polarization axis of input port at output of this device; a polarizer which mixes optical signals with orthogonal polarization states after the said delay device to the same polarization along the transmission direction of polarizer; an interferometer which receives the optical signal after said polarizer and generates interference signal; a control and processing device which receives the output signal and gives the position and amplitude information of crosstalk coupling points along PM fiber.

An exemplary of the delay device includes a polarization beam splitter (PBS) which receives optical signal from fiber or free space, and splits the received optical beam into to a first beam and a second beam polarized orthogonal; a polarization beam combiner (PBC) combining the said first beam and the said second beam into a light beam at output of said PBC. The optical path difference traveled by the first beam and second beam generates an additional delay between two orthogonal polarizations at output.

Another exemplary of the delay device composes includes a polarization beam splitter (PBS) which receives optical signal from fiber or free space, then splits the received optical beam into a first beam and a second beam polarized orthogonal. After passing a half wave plane or 45-degree rotator, the first beam is reflected back to PBS's port where the first beam comes. After passing through a half wave plane or 45-degree rotator, the second beam is reflected back to the PBS port where the second beam comes. Then the first and second beam are combined in the PBS and output from the forth port of PBS.

The optical path difference traveled by the first and second beam generates an additional delay between two orthogonal polarizations at output. The additional delay added between orthogonal polarization of PM fiber under test can effectively eliminate the ghosts peaks for measuring distributed crosstalk in PM fiber.

These and other aspects and their implementations area described in details in the description, the drawings and the claims.

BRIEF DESCRIPTION OF DRAWINGS

FIG. 1 shows an exemplary device for measuring spatial distribution of polarization crosstalk along a PM fiber by using an optical interferometer, where FIG. 1A shows the components of the device, FIG. 1B illustrates the orientation of the optical polarizer with respect to optical axes of the PM fiber and FIG. 1C illustrates a situation where stresses are present at multiple locations along the PM fiber to induce cross talk between the two orthogonal polarization modes of the PM fiber.

DETAILED DESCRIPTION

Figure 2A:
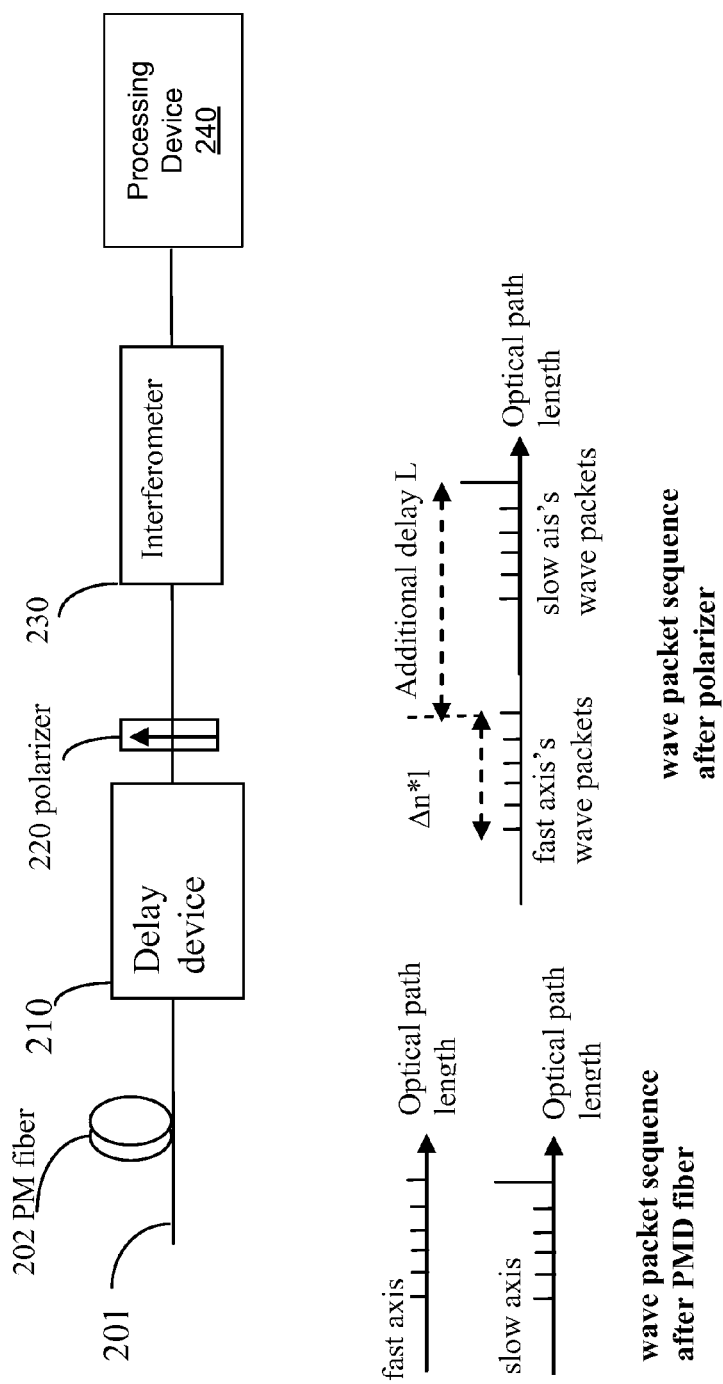
FIG. 2A shows an exemplary device for measuring spatial distribution of polarization crosstalk along a PM fiber by providing an optical delay device between the PM fiber under test and the optical interferometer, where inserts further illustrate operation of the device.

Examples for implementing techniques and devices for measuring distribution of crosstalk between two polarization modes along PM fiber are provided based on optical interferometric measurements on output light from the PM fiber. The described techniques and devices can be used to effectively suppress the number and magnitude of ghost peaks generated by multiple coupling points or locations where stresses are applied to the PM fiber to cause the crosstalk and the optical interference among these multiple coupling points along the PM fiber. Broadband light can be used in the described techniques and devices to obtain spatially resolved distribution of stresses along the PM fiber by analyzing stress-induced polarization cross-coupling along the length of the PM fiber. High measurement sensitivity, a wide dynamic range, and high spatial measurement accuracy can be achieved by using the described techniques and devices.

In a PM fiber, when the launched light is perfectly aligned along slow or fast axis at the input of the PM fiber, the optical coupling between the two polarization modes in the PM fiber occurs because intrinsic defects exist in the PM fiber or/and external stresses exerted on the PM fiber. The mode coupling between the slow axis and fast axis of the PM fiber can be characterized with polarization crosstalk. One way to represent the polarization crosstalk is the light intensity ratio between the light in the two polarization modes with optical polarizations along the slow and fast axes, respectively. In practical applications, it is desirable to identify the position of the polarization crosstalk in the PM fiber and to measure the degree of the polarization crosstalk. For example, in fiber optic gyroscopes application, the polarization crosstalk measurements can be used to screen the PM fiber before winding PM coil and to control crosstalk degradation during coil winding and to diagnose the PM coil problem after winding. The PM fiber can be used as an optical sensing medium and the polarization crosstalk can be used as a sensing mechanism. For example, the polarization crosstalk measurements can be used to obtain the stress distribution along the PM fiber and monitor space-resolved structural changes along bridges, tunnels, dams, pipeline or pipes for transporting a liquid (e.g., oil) or a gas (e.g., natural gas), or buildings. The polarization crosstalk measurements can also be used to detect an intrusion to a PM fiber link because mechanical disturbances to the PM fiber introduced by the intrusion causes polarization coupling in the PM fiber. The polarization crosstalk measurements can be used for PM fiber quality inspection by identifying defective sections of PM fiber where the crosstalk occurs, enabling the manufacturers or users to remove the defective fiber sections or take preventive measures to mitigate the impact of such defects. The polarization crosstalk measurements can also be used for measuring high polarization extinction ratios of a polarizing waveguide, obtaining the autocorrelation function of a light source, measuring the birefringence of a PM fiber and the lengths of PM fibers and single-mode (SM) fibers, and matching the optical path lengths of an interferometer.

Optical interference between light waves along the slow and fast axes of the PM fiber can generate real optical interference signals generated at the cross coupling locations in the PM fiber and ghost interference signals caused by the multiple coupling of light wave among multiple crosstalk points. The ghost signals can be strong when there are several strong coupling points on PM fiber, and thus result in wrong identification of crosstalk position and amplitude.

FIG. 1 shows an exemplary device 100 for measuring spatial distribution of polarization crosstalk along a PM fiber by using an optical interferometer, where FIG. 1A shows components of the device, FIG. 1B illustrates the orientation of the optical polarizer with respect to optical axes of the PM fiber and FIG. 1C illustrates a situation where stresses are present at multiple locations along the PM fiber to induce cross talk between the two orthogonal polarization modes of the PM fiber.

In this example, a broadband light (101) from a broadband light source is directed into the PM fiber at position A (110). The light (101) has one polarization component aligned to the slow axis of the PM fiber. Stress at position B induces polarization coupling between the two orthogonal polarizations along the fast and slow axes of the PM fiber and produces a polarization component aligned to the fast axis. Because the two polarization components travel at different group velocities in the PM fiber, the two polarization components experience a delay difference at the output (111) of the fiber (position C):

$$\Delta z = n_s z - n_f z = \Delta n z \qquad (1)$$

where $n_s$ and $n_f$ are the refractive indices of the slow and fast axes, respectively, the difference between the two refractive indices $\Delta n$ is the birefringence, and z is the distance between the coupling point B and the output point C. If an optical polarizer (120) with its optical polarization axis oriented at 45 degrees from the slow axis (FIG. 1B) is placed after the fiber output (111), one half of the optical power in each of the two polarization components passes through the polarizer (120) and emerges with the same polarization state which is linear, aligned to the polarizer axis of the polarizer (120).

Therefore, when an optical interferometer is used to receive the output light from the polarizer (120), the presence of the polarizer (120) can cause the received light, which includes two polarization components that are respectively in the two polarization modes in the PM fiber, to optically interfere. This optical interference can then be used to perform the polarization crosstalk measurements.

In FIG. 1, a Michelson interferometer is shown as an example for implementing the optical interferometer. A beam splitter 130 is provided to receive the output light from the polarizer 120 and splits the received light into a first beam along a first optical path 142 to a fixed mirror 140 and a second beam along a second optical path 143 to a movable mirror 141. An actuator is engaged to the movable mirror 141 to move the position of the movable mirror 141 to adjust the optical path length of the second optical path 143 relative to the first optical path 142. The two mirrors 140 and 144 reflect the two beams back to retrace the first and second optical paths to reach the beam splitter 130. The reflected beams from the two mirrors 140 and 141 spatially overlap with each other at the beam splitter 130 and optically interfere to produce the optical output 132 which contains the optical interference signal which has periodic interference peaks as the mirror 141 is moved in position. The distance associated with the movement of the mirror 141 between the two adjacent interference peaks in the optical interference signal is $\Delta nz$ and, accordingly, from Eq. (1), the location of the coupling point in the PM fiber is $z=\Delta z/\Delta n$. The coupling point can therefore be located using the interference graph. The coupling ratio can also be calculated from the strength of the interference peaks.

FIG. 1C illustrates presence of multiple coupling points in the PM fiber. Under this condition, the measurement process is more complicated. Assuming there are (n+1) coupling points $(x_0\ x_1\ x_2\ \ldots\ x_n)$ in the PM fiber, a linearly-polarized input wave packet (112) along the slow axis splits to $2^n$ small wave packets along the slow axis and $2^n$ small wave packets along the fast axis at the output end of PM fiber (113). Therefore, after the ith coupling point, the two wave packets sequences $P_{si}$ and $P_{fi}$ polarized along the slow axis and fast axis respectively include $2^i$ wave packets in each sequence and their optical paths length can be described as $$P_{s_i} = \begin{pmatrix} P_{s_i,1} \\ P_{s_i,2} \\ \ldots \\ P_{s_i,j} \\ \ldots \\ P_{s_i,2^i} \end{pmatrix} P_{f_i} = \begin{pmatrix} P_{f_i,1} \\ P_{f_i,1} \\ \ldots \\ P_{f_i,j} \\ \ldots \\ P_{f_i,2^i} \end{pmatrix} \qquad (2)$$

where $P_{si,j}$ (j=1 to $2^i$) and $P_{fi,\ (j=1\ to\ 2^i)}$ represent the optical patch lengths of the jth wave packet in sequences $P_{si}$ and $P_{fi}$, respectively. The optical path length of the wave packet sequences after the (i+1)th coupling point can be calculated by $$P_{s_{i+1}} = P_{f_{i+1}} = \begin{pmatrix} (x_{i+1}-x_i)n_s + P_{s_i 1} \\ (x_{i+1}-x_i)n_s + P_{s_i 2} \\ \ldots \\ (x_{i+1}-x_i)n_s + P_{s_i,2^i} \\ (x_{i+1}-x_i)n_f + P_{f_i 1} \\ (x_{i+1}-x_i)n_f + P_{f_i 2} \\ \ldots \\ (x_{i+1}-x_i)n_f + P_{f_i,2^i} \end{pmatrix}, \qquad (3)$$

Based on formula (3), the optical path length of the wave packet at output of PM fiber can be obtained by $$P_{sn} = P_{fn} \quad (4)$$

$$= \begin{pmatrix} (x_n - x_{n-1})n_s + Ps_{n-1,1} \\ (x_n - x_{n-1})n_s + Ps_{n-1,2} \\ \ldots \\ (x_n - x_{n-1})n_s + Ps_{si-1,2^{n-1}} \\ (x_n - x_{n-1})n_f + Pf_{n-1;1} \\ (x_n - x_{n-1})n_f + Pf_{n-1;2} \\ \ldots \\ (x_n - x_{n-1})n_f + Pf_{n-1,2^{n-1}} \end{pmatrix}$$

$$= \begin{pmatrix} (x_n - x_0)n_s \\ (x_n - x_{n-1})n_s + Ps_{n-1,2} \\ \ldots \\ (x_i - x_{n-1})n_s + Ps_{n-1,2^{n-1}} \\ (x_n - x_{n-1})n_f + Pf_{n-1;1} \\ (x_n - x_{n-1})n_f + Pf_{n-1,2} \\ \ldots \\ (x_n - x_{n-1})n_f + Pf_{n-1,2^{n-1}-1} \\ (x_n - x_0)n_f \end{pmatrix}$$

and the corresponding intensity $I_{sn}$ and $I_{fn}$ of wave packet sequences $P_{sn}$ and $P_{fn}$ can be calculated by the following formulae:

$$Is_n = \frac{Is_{n-1}}{1+c_n} \oplus \frac{c_n}{1+c_n} If_{n-1} \quad (5)$$

$$= \begin{pmatrix} Is_{n-1,1}/(1+c_n) \\ Is_{n-1,2}/(1+c_n) \\ Is_{n-1,3}/(1+c_n) \\ \ldots \\ Is_{n-1,2^{i-1}}/(1+c_n) \\ If_{n-1,1}*c_n/(1+c_n) \\ If_{n-1,2}*c_n/(1+c_n) \\ If_{n-1,3}*c_n/(1+c_n) \\ \ldots \\ If_{n-1,2^{n-1}}*c_n/(1+c_n) \end{pmatrix}$$

$$\approx \begin{pmatrix} 0 \\ 0 \\ 0 \\ \ldots \\ 0 \\ Is_{n-1,1}/(1+c_n) \\ Is_{n-1,2}/(1+c_n) \\ Is_{n-1,3}/(1+c_n) \\ \ldots \\ Is_{n-1,2^{i-1}}/(1+c_n) \end{pmatrix}$$

$$If_n = \frac{c_n}{1+c_n} Is_{n-1} \oplus \frac{1}{1+c_n} If_{n-1} \quad (6)$$

$$= \begin{pmatrix} Is_{n-1,1}*c_n/(1+c_n) \\ Is_{n-1,2}*c_n/(1+c_n) \\ Is_{n-1,3}*c_n/(1+c_n) \\ \ldots \\ Is_{n-1,2^{i-1}}*c_n/(1+c_n) \\ If_{n-1,1}/(1+c_n) \\ If_{n-1,2}/(1+c_n) \\ If_{n-1,3}/(1+c_n) \\ \ldots \\ If_{n-1,2^{n-1}*c_n}/(1+c_n) \end{pmatrix}$$

where $c_n$ is the coupling coefficients at point xn, and can be used to represent a crosstalk parameter defined by Crosstalk=abs(10*log $c_n$)

After passing through the 45° aligned polarizer (120), the two wave packet sequences $P_{sn}$ and $P_{fn}$, originally polarized along the slow axis and fast axis in the PM fiber, will be the mixed into one wave packet sequence polarized along transmission direction of the polarizer (120). The optical path length P and the corresponding optical intensity of the wave packet sequence polarized along transmission direction of the polarizer (120) can be calculated as $$P = \begin{pmatrix} p1 \\ p2 \\ p3 \\ \ldots \\ \ldots \\ \ldots \\ \ldots \\ p_{2^n} \end{pmatrix} \quad (7)$$

$$= \begin{pmatrix} (x_n - x_{n-1})n_s \\ (x_n - x_{n-1})n_s + Ps_{n-1,2} \\ \ldots \\ (x_n - x_{n-1})n_s + Ps_{n-1,2^{n-1}} \\ \overline{(x_n - x_{n-1})n_f + Pf_{n-1;1}} \\ (x_n - x_{n-1})n_f + Pf_{n-1,2} \\ \ldots \\ (x_n - x_{n-1})n_f + Pf_{n-1,2^{n-1}-1} \\ (x_n - x_0)n_f \end{pmatrix}$$

$$= \begin{pmatrix} P_{s_{n-1}} \\ P_{f_{n-1}} \end{pmatrix}$$

$$I \approx \begin{pmatrix} Is_{n-1,1}/(1+c_n) \\ Is_{n-1,2}/(1+c_n) \\ Is_{n-1,3}/(1+c_n) \\ \ldots \\ Is_{n-1,2^{i-1}}/(1+c_n) \\ If_{n-1,1}/(1+c_n) \\ If_{n-1,3}/(1+c_n) \\ If_{n-1,3}/(1+c_n) \\ \ldots \\ If_{n-1,2^{n-1}}/(1+c_n) \end{pmatrix} \quad (8)$$

$$= \begin{pmatrix} Is_{n-1} \\ If_{n-1} \end{pmatrix}$$

As the mirror 141 moves to change its position in the second optical path, any two pulses in wave packet sequence P (see formula 7) can generate an interference signal and the position of interference pattern is determined by the delay difference between these two pulses. There are total $2^n*(2^n-1)/2$ peaks that are generated in which there are n interference peaks representing the actual coupling points and the rest of the interference peaks are ghosts peaks. These ghost peaks not only generate fake coupling signals, but also can possibly produce compositions at the true interference peaks associated with the true coupling locations. Therefore, the presence of the ghost peaks degrades the measurement accuracy in measuring the crosstalk distribution and amplitude.

Formulae (7) and (8) show that, the wave packet sequence has two groups, one represented by the top half of Formula (7) and comes from $Psn_{-1}$ polarized along the slow-axis when in the PM fiber, and another is represented by the bottom half of Formula (7) and comes from $Pf_{n-1}$ polarized along the fast axis when in the PM fiber. The positions of interference patterns between any two pulses in the group $Ps_{n-1}$ have nothing to do with the length of the last PM segment $(x_n-x_{n-1})$, and their delay difference are all shorter than the $(x_{n-1}-x0)*\Delta n$. The positions of interference patterns between any two pulses in the group $Pf_{n-1}$ also has nothing to do with the length of last PM segment $(x_n-x_{n-1})$, and their delay difference are all less than the $(x_{n-1}-x0)*\Delta n$. For the interference between top and bottom half of wave packet P, the delay difference between any one wave packets from group of $Ps_{n-1}$ and $Pf_{n-1}$, respectively, is $(x_n-x_{n-1})\Delta n+(Ps_{n-1,j}-Pf_{n-1,k})$. If the length of the last PM segment $x_n-x_{n-1}$ is longer than the length of the total length $(x_{n-1}-x_0)$ of the PM segments from 0 to n-1, the interference peaks will split into two groups at position. One group is generated by the interference between any two wave packets in sequence $Ps_{n-1}$ or $P_{sf-1}$; another group is generated by the interference between one wave packet in sequence Psn-1 and one in $P_{sf-1}$ respectively. A high value for the extinction ratio (ER) of a PM fiber link generally suggests that the coupling coefficients of c1, c2 . . . ci in the PM fiber link are very small so the pulse P1 in formula (7) has a relatively high power. If the wave packets generated by over two times coupling and over three order's interference are ignored, there are only n interference signals in the second interference group and the corresponding delay difference between the first optical path 142 as the reference arm of the optical interferometer (in FIG. 1A) and the second optical path 143 as the changing arm of the optical interferometer are:

$$(x_n - x_{n-1})\Delta n + \begin{pmatrix} 0 \\ (x_{n-1} - x_{n-2})\Delta n \\ (x_{n-1} - x_{n-3})\Delta n \\ \ldots \\ \ldots \\ (x_{n-1} - x_0)\Delta n \end{pmatrix} \quad (9)$$

which exactly corresponds to the coupling points from 0 to n−1 at the PM fiber.

To reduce the ghost interference peaks, an optical delay can be inserted between the PM fiber and the polarizer (212) to selectively cause an additional delay in light in one of the two polarization modes of the PM fiber. FIG. 2A shows an exemplary device for measuring spatial distribution of polarization crosstalk along a PM fiber by providing an optical delay device between the PM fiber under test and the optical interferometer, where inserts further illustrate operation of the device. The input light (201) is split to two orthogonal sequences wave packets after passing though the PM fiber under test (202) and the two sequences are polarized along the slow-axis and the fast-axis of the PM fiber, respectively. The delay device 210 adds an additional delay L between these two orthogonal wave packet sequences, and the delay L in vacuum should be longer than $\Delta n*l$ where $\Delta n$ is the birefringence of the PM fiber and l is the length of the PM fiber and the additional delay L is added to the light polarized along the slow axis of the PM fiber in this example. After passing the 45 degree aligned polarizer (220), these two sequences of wave packets with the additional delay L are mixed together with the same polarization state defined by the polarizer (220). An optical interferometer 230 is provided downstream from the polarizer (22) to produce a serial of interference signals at delays between $\Delta n*l$ and $(L-\Delta n*l)$, these interference signals only correspond the real signals caused by polarization coupling at coupling locations and ghosts peaks are suppressed or eliminated. A processing device 240 is provided to receive the output of the optical interferometer 230 and processes the data in the output to generate the measurements for the locations of coupling points in the PM fiber and the magnitudes of the coupling at the respective coupling points.

Figure 2B:
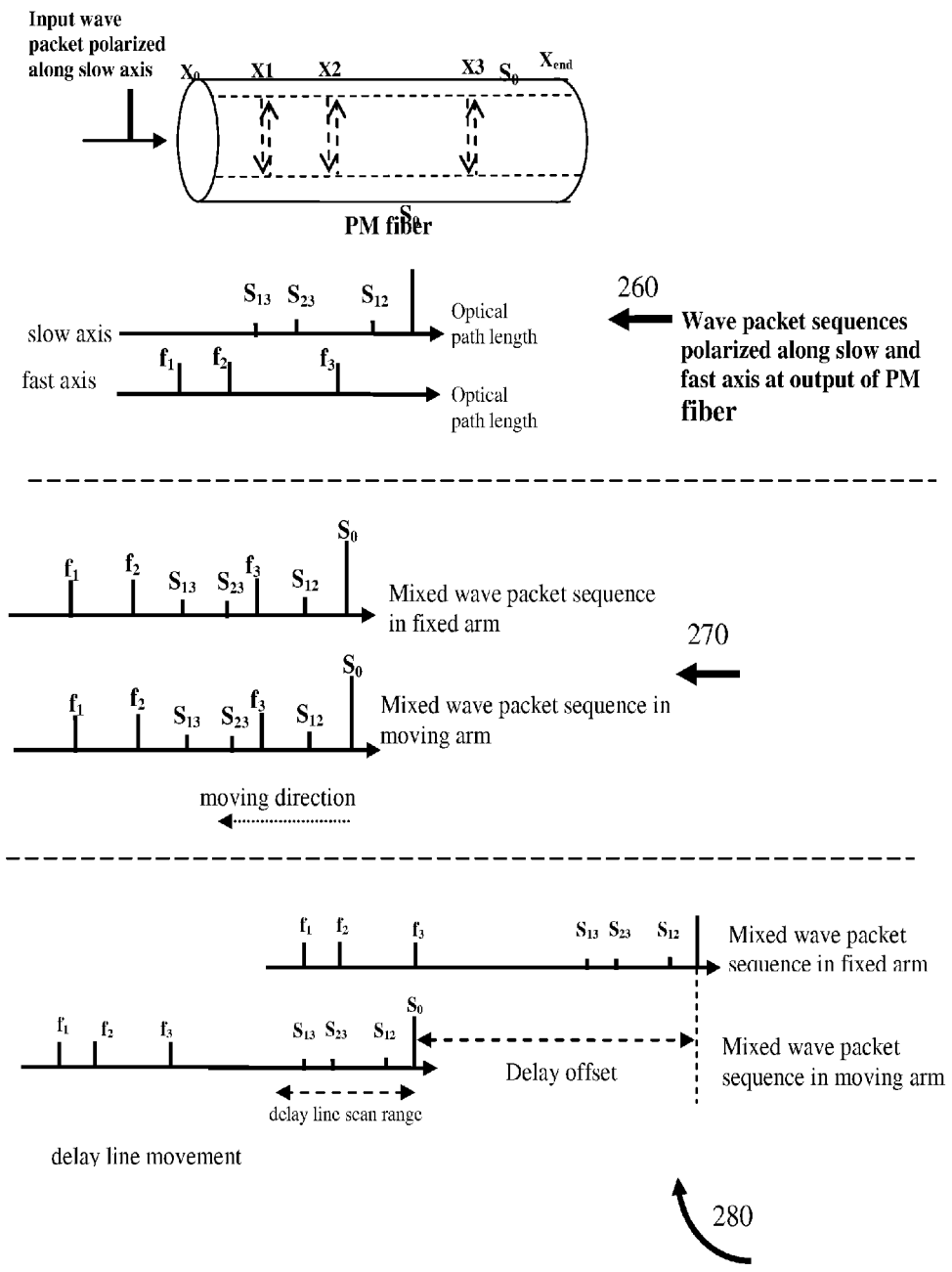
FIG. 2B illustrates from the top to the bottom, a PM fiber under stress at three coupling points along the PM fiber and the wave packet sequences polarized along the slow and fast axes at output of the PM fiber, wave packet sequence in the device in FIG. 1, and wave packet sequence in the device in FIG. 2A with the optical delay device.

FIG. 2B illustrates, from the top to the bottom, a PM fiber under stress at three coupling points along the PM fiber and the wave packet sequences polarized along the slow and fast axes at output of the PM fiber, wave packet sequence in the device in FIG. 1 without the additional optical delay device, and wave packet sequence in the device in FIG. 2A with the optical delay device.

Consider a situation where there are three coupling points x1, x2 and x3 along the PM fiber and the light input to the PM fiber has no fast axis component and is polarized along the slow axis of the PM fiber. At each coupling point, light is coupled not only from the polarization mode along the slow axis to the polarization mode along the fast axis, but also from the polarization mode along the fast axis to the polarization mode along the slow axis. As a result of this coupling, the resulted wave packet series output by the PM fiber include wave packets caused by multiple couplings.

As shown FIG. 2B, four wave packets $S_0$, $S_{12}$, $S_{23}$ and $S_{13}$ emerging at the output are aligned to the slow axis of the PM fiber. $S_0$ is the light that directly propagates along the slow-axis from input $x_0$ to the end of the fiber $x_{end}$. The optical path length traveled by $S_0$ is $n_s L$ where L is the length of the fiber. $S_{12}$, $S_{23}$ and $S_{13}$ are generated by coupling along the PM fiber. More specifically, $S_{12}$ is the light propagated from input to $x_1$ along the slow axis, then from $x_1$ to $x_2$ along the fast axis, then from $x_2$ to the output along the slow axis; $S_{23}$ is the light propagated from input to $x_2$ along the slow axis, then from $x_2$ to $x_3$ along the fast axis, then from $x_3$ to the output along the slow axis; and $S_{13}$ is the light propagated from input to $x_1$ along the slow axis, then from $x_1$ to $x_3$ along the fast axis, then from $x_3$ to the output along the slow axis.

Along the fast axis, three main packets $f_1$, $f_2$, and $f_3$ emerge at the output of the fiber. They are generated by coupling from the slow axis to the fast axis at points $x_1$, $x_2$ and $x_3$, respectively. More specifically, the wave packet $f_1$ is the light propagating from input to $x_1$ along the slow axis, then from $x_1$ to output along the fast axis; the wave packet $f_2$ is the light propagating from input to $x_1$ along the slow axis, then from $x_2$ to output along the fast axis; and the wave packet $f_3$ is the light propagating from input to $x_3$ along the slow axis, then from $x_3$ to output of the fast axis. The wave packet generated by a third order coupling from input to $x_1$ along slow axis, from $x_1$ to $x_2$ along fast axis, from $x_2$ to $x_3$ along slow axis, then from $x_3$ to output along fast axis. In many practical situations, this third order coupling can be neglected because its optical power is very low.

After passing through the 45° oriented analyzer, the wave packets aligned to the slow and fast axes will be mixed together (270 and 280 in FIG. 2B). If this mixed light is input to an interferometer, a series of interference peaks can be observed as the delay in one arm of the interferometer is changed. Table 1 lists interference peaks for the example shown in FIG. 2B. Interference peaks generated by the interference between $S_0 \leftrightarrow f_1$, $S_0 \leftrightarrow f_2$, and $S_0 \leftrightarrow f_3$ represent the actual three coupling points $x_1$, $x_2$ and $x_3$ in the PM fiber and other peaks listed in Table 1 are ghost peaks which can undesirably cause errors in identification of the actual coupling points $x_1$, $x_2$ and $x_3$. Ghost peaks can also be superimposed on the real peaks, reducing the crosstalk measurement accuracy.

In order to suppress the number and magnitude of the undesired ghost peaks, the delay device 210 in FIG. 2A can be inserted between the PM fiber's output and the polarizer's input. This delay device is polarization selective and can add an additional delay between the slow axis and the fast axis of the PM fiber. Thus, the two wave packet sequences from the fast-axis and slow-axis are separated in time after the light passes through the analyzer (see 280 in FIG. 2B). If we preset the same delay offset between the fixed and moving arms in the interferometer, the zero order, second order and most higher order interference signals will not be generated as the delay line scans (see Table 1); therefore, most of the ghost peaks disappear during measurement. Consequently, the device in FIG. 2A has higher position measurement accuracy, higher dynamic range and higher sensitivity than other interferometer-based devices such as the device in FIG. 1.

The polarization-selective optical delay device (210) in FIG. 2A can be implemented in various configurations and can be selected based on the needs of a particular application for the device (210) in FIG. 2A. Light in the two polarization modes of the PM fiber can be separated into two optical signals along two separate paths by using a polarization beam splitter and a variable optical delay mechanism can be used to cause a variable optical delay between the two separated optical signals before recombining the two separated signals into a combined optical signal for subsequent processing by the downstream linear optical polarizer and the optical interferometer. FIGS. 3, 4, 5, 6, 7 and 8 show several examples for implementing such an optical delay device. These examples can be configured as fixed optical delay devices that produce a desired optical delay $\Delta L (>\Delta n \ast l$ where l is the length of PM fiber under test) or a variable delay that can be controlled to be at the above desired optical delay $\Delta L$.

TABLE 1 comparison between invented method to previous art

|  | Device in FIG. 1 | Device in FIG. 2A |
|---|---|---|
| Zero-order interference | $S_0 \leftrightarrow S_0$, $S_{12} \leftrightarrow S_{12}$, $S_{23} \leftrightarrow S_{23}$, $S_{13} \leftrightarrow S_{13}$, $f_1 \leftrightarrow f_1$, $f_2 \leftrightarrow f_2$, $f_3 \leftrightarrow f_3$ | None |
| Interference from single-order coupling | $S_0 \leftrightarrow f_1$, $S_0 \leftrightarrow f_2$, $S_0 \leftrightarrow f_3$ | $S_0 \leftrightarrow f_1$, $S_0 \leftrightarrow f_2$, $S_0 \leftrightarrow f_3$ |
| Interference from second order coupling | $S_0 \leftrightarrow S_{12}$, $S_0 \leftrightarrow S_{23}$, $S_0 \leftrightarrow S_{13}$ $f_1 \leftrightarrow f_2$, $f_1 \leftrightarrow f_3$, $f_2 \leftrightarrow f_3$ | None |
| Interference from higher order coupling | $S_{12} \leftrightarrow f_3$, $S_{12} \leftrightarrow S_{23}$, $S_{12} \leftrightarrow S_{13}$, $S_{12} \leftrightarrow f_2$, $S_{12} \leftrightarrow f_1$ $f_3 \leftrightarrow S_{23}$, $f_3 \leftrightarrow S_{13}$ $S_{23} \leftrightarrow S_{13}$ $S_{23} \leftrightarrow f_2$, $S_{23} \leftrightarrow f_1$ $S_{13} \leftrightarrow f_2$, $S_{13} \leftrightarrow f_1$ | $S_{12} \leftrightarrow f_3$, $S_{12} \leftrightarrow f_2$, $S_{12} \leftrightarrow f_1$ $S_{23} \leftrightarrow f_2$, $S_{23} \leftrightarrow f_1$ $S_{13} \leftrightarrow f_2$, $S_{13} \leftrightarrow f_1$ |

Figure 3:
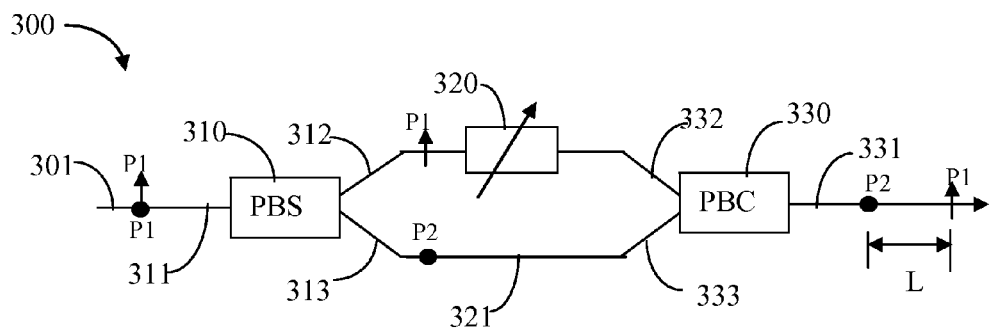
FIG. 3 shows an example of an optical delay device for generating a desired delay between two linear orthogonal polarization states P1 and P2.

FIG. 3 gives an exemplary of an optical delay device for generating a desired delay between two linear orthogonal polarization states P1 and P2. The input orthogonal linear polarization states are aligned to the axis of the polarization beam splitter (310, PBS) at input 311, and split into two signals at two output ports 312 (P1) and 313 (P2) that are coupled to two separate arms 320 and 321, respectively. An optical delay line is inserted into one of the optical arms 320 and 321, for example, in the arm 320 as illustrated, to cause the desired optical delay between the two polarizations and the delay can be varied. A polarization beam combiner (PBC 330) is coupled to two arms 320 and 321 and has input ports 332 and 333 to respectively receive these two orthogonal linear polarizations from the two arms 320 and 321. The PBC 330 combines the received optical signals from the two arms 320 and 321 into a combined signal with a delay L between the two polarization states P1 an P2 at output 331 of PBC. The delay L is determined by the difference of the delay in the arm 320 ($Delay_{320}$) and the delay in the arm 321 ($Delay_{321}$).

Figure 4:
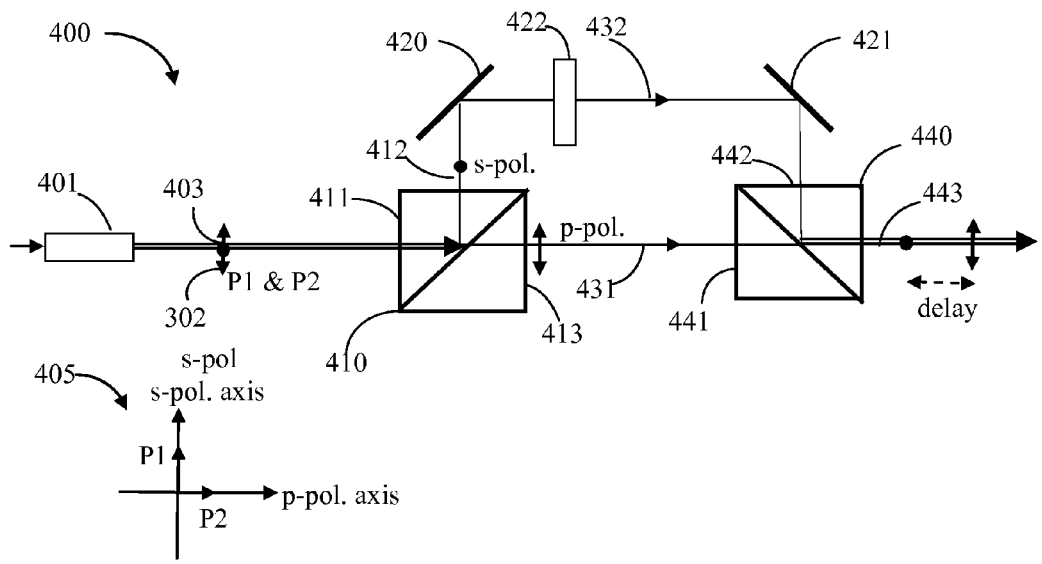
FIG. 4 shows another example of an optical delay device for generating a desired delay between two linear orthogonal polarization states P1 and P2.

FIG. 4 gives another exemplary optical delay device for generating a desired delay between two linear orthogonal polarization states P1 and P2 in the PM fiber. At input, the output terminal of the PM fiber under test is connected to a PM collimator 401 which receives the light and preserves the polarization states of the light received from the PM fiber. The received light at the PM collimator 401 is coupled into a free-space PBS (410) of the optical delay device. The optical delay device uses in the PBS (410) to split the incoming light into two orthogonal polarization light beams in s-polarization along a first optical path 412 and in p-polarization along a second, separate optical path 413. A second PBS (440) is provided as a polarization beam combiner (PBC) to receive output beams from the two optical paths 412 and 413 and to combine the received light in the s-polarization and p-polarization into a combined optical output 443. Mirrors 420 and 421 may be used to direct the light in the first optical path 413 to the PBS 440. An transmittance optical medium (422) can be inserted in two one of the two optical paths 413 and 412 to cause the desired delay L between the two polarization states. The optical medium (422) may be adjusted to change the delay L. In addition, the mirrors 420 and 421 may be adjusted to change the delay L.

The collimator 401 should be aligned to make polarization P1 and P2 parallel to s-pol or p-pol axis of PBS 410, respectively. P-polarization light directly travels to the p-pol input 441 of a free-space PBC (440) and its optical path can be adjusted by changing the distance between PBS (410) and PBS (440). S-pol. light arrives s-pol input 442 of PBS (440) after passing the reflector 420, the delay medium 422 and the reflector 421. The optical path length of the first optical path 413 can be adjusted by changing the position of reflectors 420 and 421, or add some transmittance optical medium (422) in the arm 432. In PBC (440), the s-pol. and p-pol lights are combined into one light beam at output; the output light beam can be coupled into a PM fiber using a collimator when a fiber-based interferometer is used or directly coupled into a free space interferometer for measurement.

Figure 5:
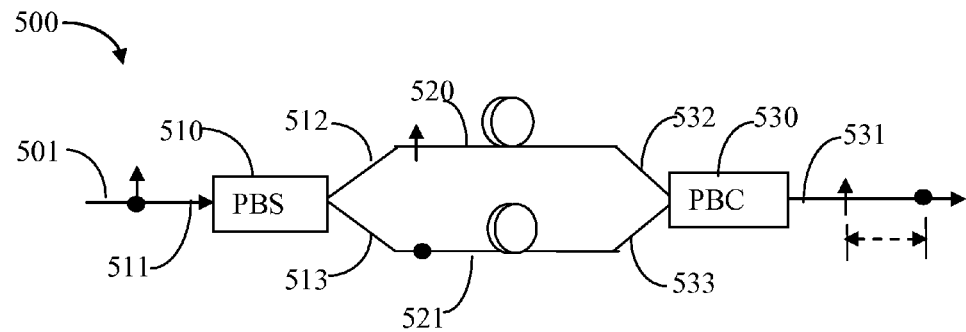
FIG. 5 shows another example of an optical delay device for generating a desired delay between two linear orthogonal polarization states P1 and P2.

FIG. 5 gives a fiber-based exemplary optical delay device for generating a desired delay between two linear orthogonal polarization states P1 and P2. At input, the output of PM fiber under test is connected into the PM input 511 of a pigtailed PBS 510, the slow axis the PM fiber under test should be aligned to the slow axis of input PM fiber of PBS, thus polarizations P1 and P2 will be separated into two separated optical signals at the output ports 512 and 513 of PBS 510. Two fiber loops 520 and 521 are coupled to the ports 512 and 512 of the PBS 510, respectively, to receive the two separated optical signals in polarizations P1 and P2 and provide two optical paths for the optical signals. A polarization beam combiner (PBC 530) is coupled to the two fiber loops 520 and 521 at its inputs 532 and 533 to receive the optical signals in the two polarization states P1 and P2. The received optical signals are combined by the PBC 530 into the output PM fiber of PBC (530). A variable delay device, such as a fiber stretcher, can be coupled into one of the two fiber loops 520 and 521 to cause the variable delay L between the two polarization states P1 and P2.

Figure 6:
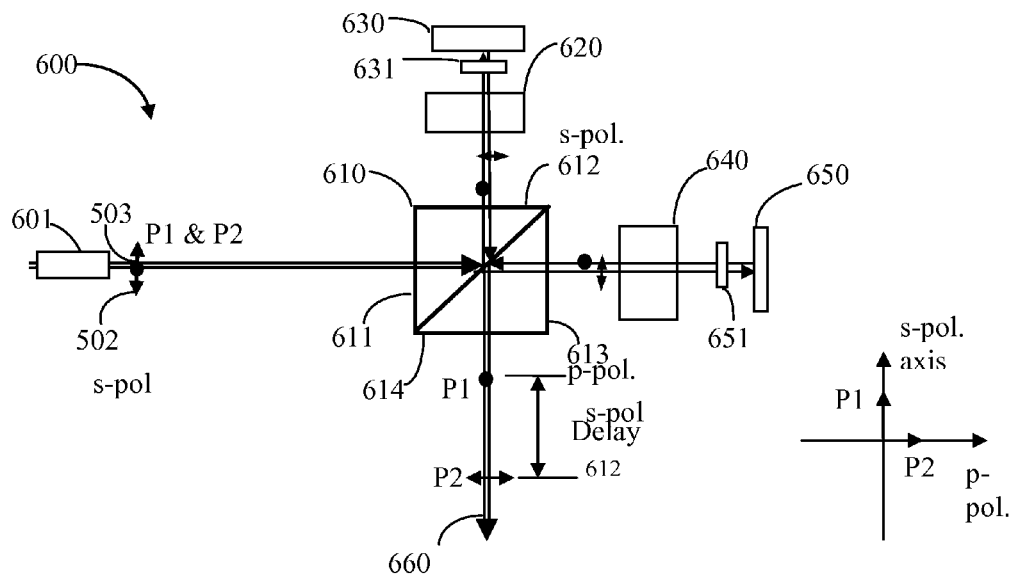
FIG. 6 shows another example of an optical delay device for generating a desired delay between two linear orthogonal polarization states P1 and P2 using only one polarization beam splitter (PBS) cube.

FIG. 6 shows an exemplary optical delay device for generating a desired delay between two linear orthogonal polarization states P1 and P2 using only one PBS cube. At input, the PM fiber under test is connected to a PM collimator 601 to receive the light in the two polarization states of the PM fiber and the received light is coupled into a free-space PBS (610) from an input port 611. The collimator is aligned to make polarization P1 and P2 parallel to s-pol axis or p-pol axis of PBS 610, respectively. P-polarized light and S-polarized light received at the input port 611 are output at two output ports 613 and 612 of the PBS 610 along two separated optical paths. The P-polarized light passes a delay medium 640 and an optical polarization component 651 (e.g., a λ/4 wave plate or 45° Faraday rotator), then is reflected back to PBS 610 by a mirror 650. A 45° Faraday rotator rotates polarization light by 45° when the light passes through the Faraday rotator once and, if the transmitted light is reflected back to pass through the Faraday rotator again, a total rotation of 90° is generated in the reflected light. The S-polarized light output by the port 612 passes a second delay medium 620 and a second optical polarization component 631 (e.g., a λ/4 wave plate or 45° Faraday rotator), then is reflected back to PBS 610 by a mirror 630. The PBS 610 combines the s-pol. and p-pol light into the combined output 660 at the output port 614. The output 660 can be coupled into a PM fiber using a collimator for subsequent processing by a fiber-based interferometer or directly coupled into a free space interferometer for measurement. The delay between P1 and P2 at output 660 can be adjusted by changing the position of mirror 630 or 650, or insert desired optical transmittance medium 620 or 640.

Figure 7:
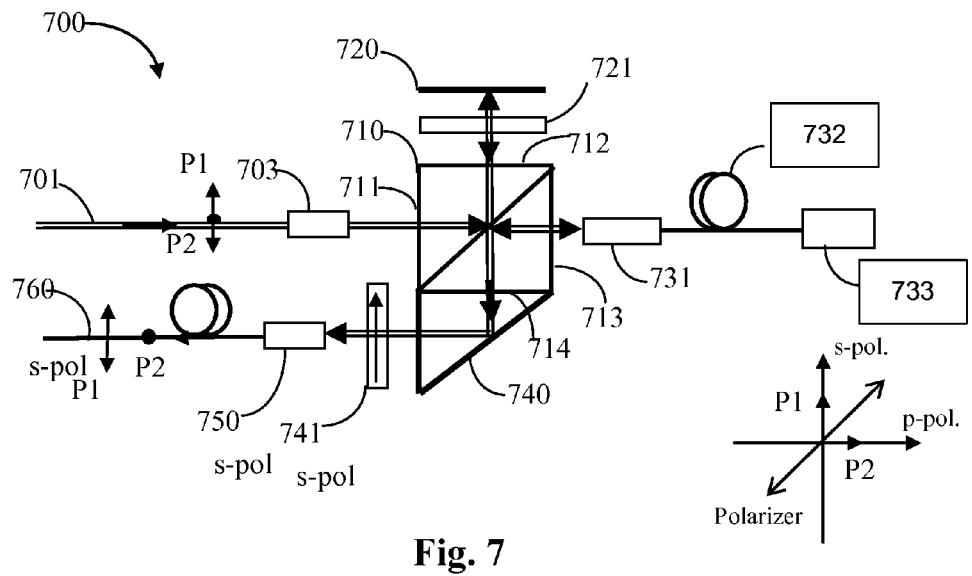
FIG. 7 shows another example of an optical delay device for generating a desired delay between two linear orthogonal polarization states P1 and P2 using only one PBS cube.

FIG. 7 shows another exemplary of an optical delay device for generating a desired delay between two linear orthogonal polarization states P1 and P2 using only one PBS cube. At input, the PM fiber under test is connected to a PM collimator 701, then light is coupled into a free-space PBS (710) from input port 711. The collimator is aligned to make polarization P1 and P2 parallel to s-pol axis or p-pol axis of PBS, respectively. The PBS 710 splits the input light into S-polarized light at the output port 712 and P-polarized light at the output port 713. The S-pol. light passes a polarization element 721 (e.g., a λ/4 wave plate or 45° Faraday rotator) and is reflected back to the port 712 of PBS 710 by a reflector 720. At port 713 of PBS (710), the p-pol light is coupled into a single-mode (SM) fiber collimator 731 which is coupled to a SM fiber loop 732. A fiber pigtailed Faraday mirror 733 is coupled to the fiber loop 732 to reflect the light back to the port 713 of PBS (710) by passing through the SM fiber loop 732 and the SM collimator 731. At the output port 714 of PBS (710), s-pol. and p-pol light are combined by the PBS 710 into a combined light beam. A right-angle prism (740) is used to receive the combined light beam from the output port 714 of the PBS 710 and directed to the combined light beam into a PM collimator or a SM fiber collimator 750. A 45° aligned polarizer 741 is provided between the SM fiber collimator 750 and the right-angle prism 740 to mix the S and P polarized light in the combined light beam. The delay between P1 and P2 at output 760 can be adjusted by changing the length of the fiber loop 732 via a fiber stretcher coupled to the fiber loop 732.

Figure 8:
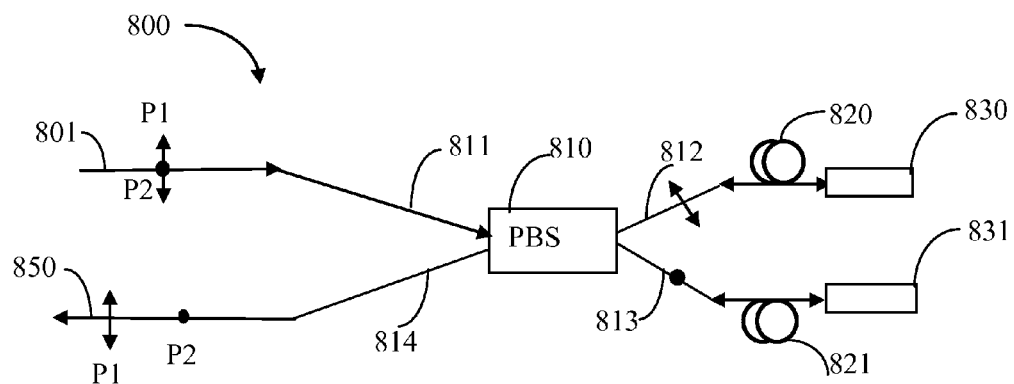
FIG. 8 shows yet another example of an optical delay device for generating a desired delay between two linear orthogonal polarization states P1 and P2 using one four-ports pigtailed PBS.

FIG. 8 gives an exemplary all-fiber optical delay device for generating a desired delay between two linear orthogonal polarization states P1 and P2 using one four-port pigtailed PBS. The output 801 of the PM fiber under test is connected into the PM input 811 of a 4-port fiber pigtailed PBS (810), the slow axis the PM fiber under test is aligned to the slow axis of input PM fiber of PBS, thus polarization states P1 and P2 are separated into two optical beams at two ports 812 and 813 of PBS 810. Two SM/PM fiber loops 820 and 821 are connected to the ports 812 and 813. Two 45-degree Faraday mirrors 830 and 831 are coupled to the terminals of the fiber loops 820 and 831, respectively, to reflect the light signals in the two fiber loops 820 and 831 with a 90-degree rotation in polarization back to the PBS 810. At the PM output 814 of PBS (810), the s-pol. and p-pol light reflected back in the fiber loops 820 and 821 are combined into one optical beam. The delay between the two polarization states P1 and P2 at output 850 can be adjusted by changing the relative length between fiber loops 820 and 821 by using one or two fiber stretchers.

Figure 9:
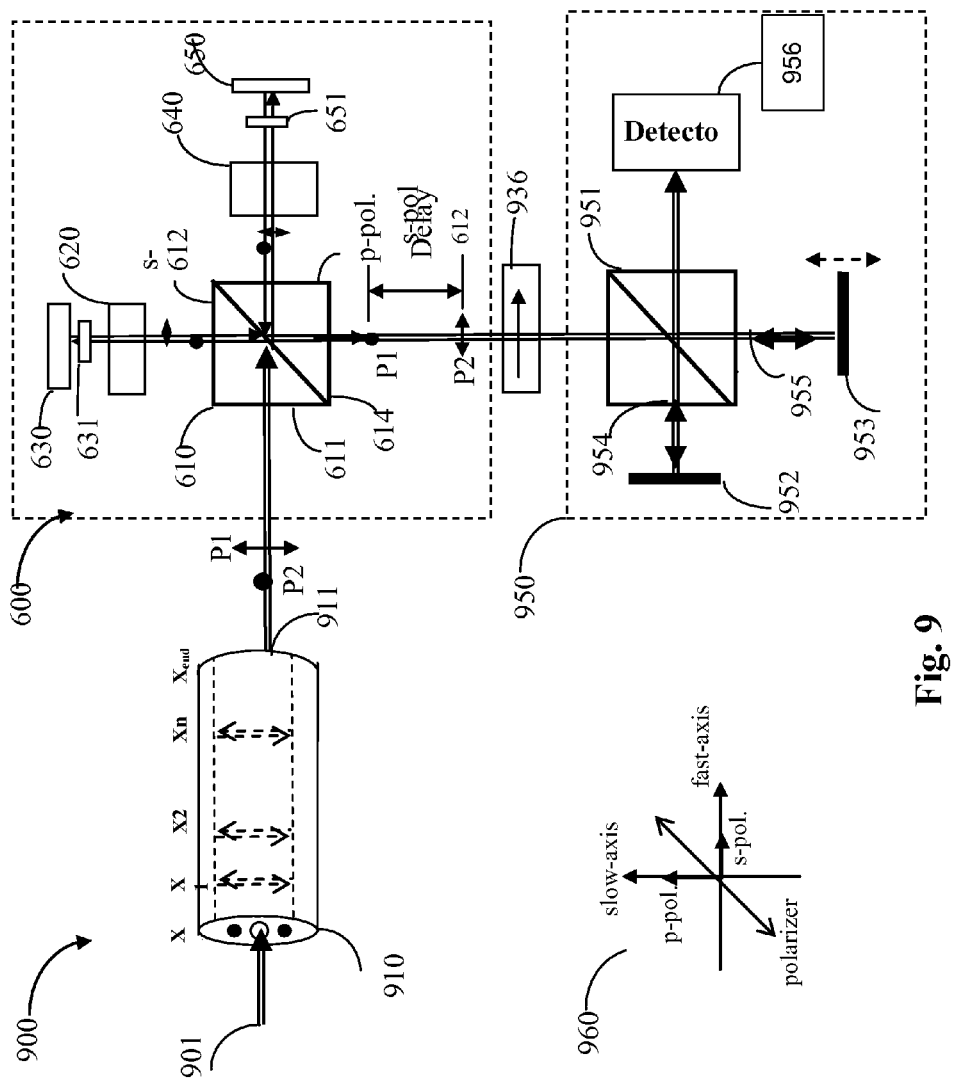
FIG. 9 shows an exemplary apparatus for measuring distributed polarization crosstalk in PM fiber.

FIG. 9 further shows an exemplary device for measuring the distribution of polarization crosstalk of PM fiber based on the design in FIG. 2A and the optical delay device in FIG. 6A. A broadband light enters the PM fiber at position 901, it has only one polarization component, aligned to the slow axis of PM fiber 910 under test. After passing through the PM fiber under test, the wave packet at input 901 is split to two group wave packets sequence along fast axis and slow axis respectively. These two wave sequences are aligned and input the delay device 600 in FIG. 6, at the output of 600 an additional delay ΔL is added between polarization state P1 and P2. After passing through a 45° aligned polarizer 936 which mixes the two polarization states P1 and P2 at the output of the optical delay device 600, the light is input into a Michelson interferometer 950 formed by an optical beam splitter PBS 951, a fixed mirror 952 forming the reference arm 954 and a movable mirror 953 forming the adjustable optical arm 955. The PBS 951 splits received light from the polarizer 939 into a first beam to the mirror 952 (e.g., by reflection) and a second beam to the mirror 953 (e.g., by transmission) and combines the returned light from both arms to produce a combined optical output. An optical detector 956 is used to receive the combined optical output from the PBS 951 to detect the optical interference information in the combined optical output. The delay between the reference arm 954 and moving arm 955 can be set by an offset ΔL generated by the delay device 600. The interference pattern can be generated by moving the mirror 953 from zero to −Δn*l where l is the length of PM fiber under test. Using this setup, the zero-order interference will be suppressed and most of ghost peaks generated by the interference between multiple coupling can be suppressed or eliminated.

Figure 10:
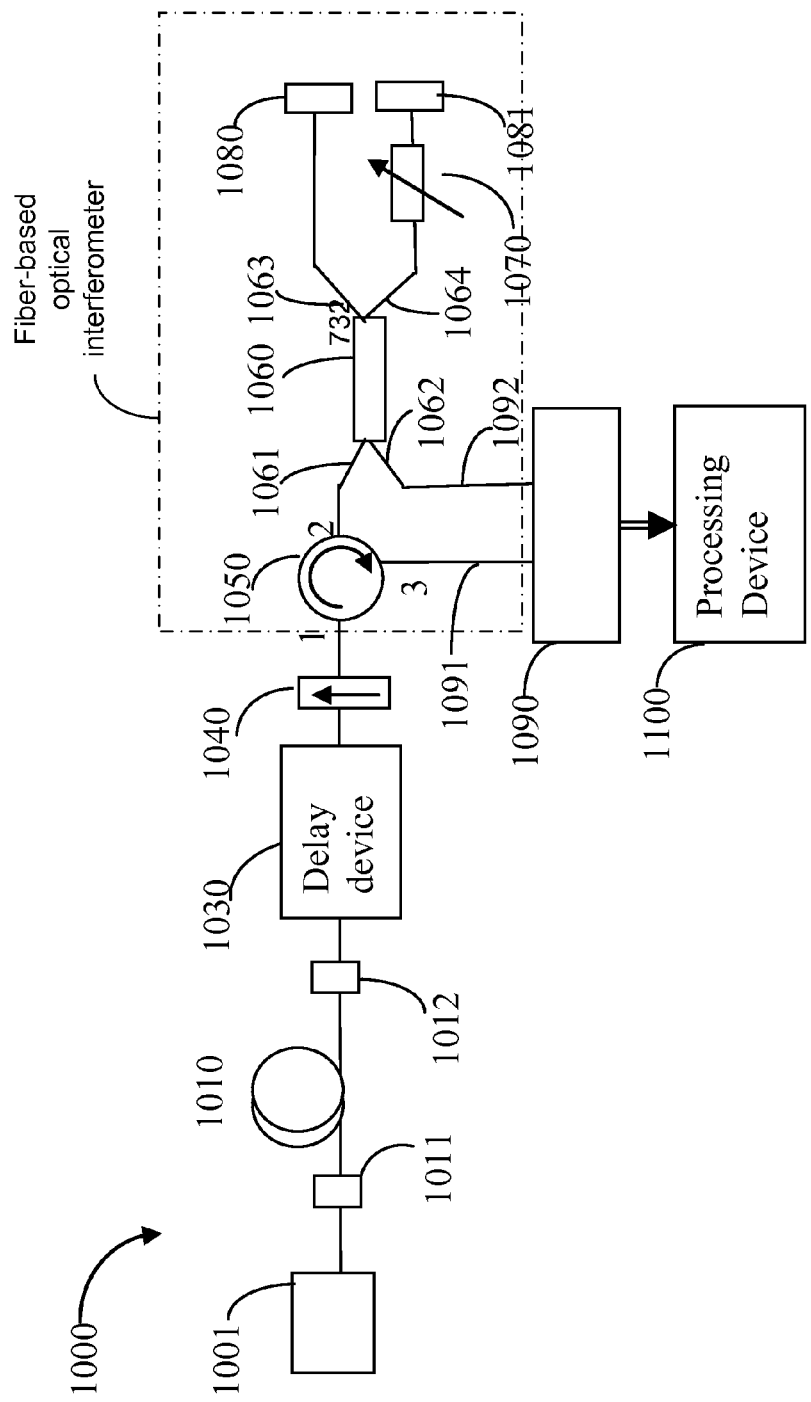
FIG. 10 shows another exemplary apparatus for measuring distributed polarization crosstalk in PM fiber using fiber pigtailed components.

FIG. 10 shows an exemplary device 1000 for measuring the distribution of polarization crosstalk of PM fiber using fiber pigtailed components based on the design principle in FIG. 2A. A linearly polarized broadband light source 1001 is used to generate input light to enter the PM fiber at input 1011 of PM fiber 1010 under test, where the optical polarization of the input light is aligned to the slow axis of PM fiber 1010 under test. After passing through the PM fiber 1010 under test, the wave packet at input 1011 is split to two groups of wave packet sequences which are polarized along the fast axis and the slow axis, respectively. These two wave sequences are input to the optical delay device 1030 which causes, at the output of 1030, an additional delay ΔL(>Δn*l where l is the length of PM fiber under test) between two orthogonal polarization states P1 and P2 of the PM fiber 1010 under test. A 45° aligned polarizer 1040 is placed downstream from the delay device 1030, these two wave packet sequences are mixed with the same polarization state as the transmission axis of the polarizer 1040. The light output by the polarizer 1040 is input to a fiber-based optical interferometer for optical interference measurements.

This fiber-based optical interferometer is constructed as shown by the box named "fiber-based optical interferometer." The output of the polarizer 1040 is coupled to the port 1 of an optical circulator 1050 which directs the light from input port 1 to output port 2 of the circulator 1050. A 4-port fiber coupler 1060 is coupled to the port 2 at the input port 1061 of the fiber coupler 1060. The light received from the port 2 is split into separate signals at two output ports 1063 and 1064 of the fiber coupler 1060. A variable delay line 1070 is coupled to the fiber port 1064 and a Faraday mirror 1081 is coupled to the other end of the optical delay line 1070 to reflect light back so that the polarization of the reflected light is orthogonal the polarization of the light incident to the Faraday mirror 1081. A second Faraday mirror 1080 is coupled to the fiber output port 1063 of the fiber coupler 1060 to reflect the light back so that the polarization of the reflected light is orthogonal the polarization of the light incident to the Faraday mirror 1080. The delay between the reference arm 1063 and the moving arm 1064 of the interferometer is set by an offset ΔL which is same as the delay generated by the delay device 1030. The reflected light signals received at the ports 1063 and 1064 are spatially overlapped in the fiber coupler 1060 to produce optical interference which is contained in two output interference signals at the ports 1061 and 1062 of the fiber coupler 1060. The output interference signal at the port 1061 is directed to the port 2 of the optical circulator 1050 which directs the signal to the port 3 as the first interference signal 1091. The output interference signal at the port 1062 is directed as the second interference signal 1092.

The interference signals 1091 and 1092 can be directed into a balance detector 1090 by changing the delay of the variable delay line 1070 from zero to −Δn*l where Δn and l are birefringence and the length of PM fiber under test. Using this setup, the zero-order interference is suppressed and most of ghost peaks generated by the interference between multiple couplings are eliminated during scanning of the delay line 1070 in the interferometer. A processing device 1100 is provided to receive the output of the balanced detector 1090, which includes two optical detectors that receives the two optical outputs from the fiber-based optical interferometer: a first optical output from the fiber port 1061 of the fiber coupler via the optical circulator 1050 and a second optical output from the fiber port 1062 of the fiber coupler 1060. The processing device 1100 processes the data in the output of the balanced detector 1090 to generate the desired measurements for locations of coupling points in the PM fiber and the magnitudes of the coupling at the respective coupling points.

Figure 11:
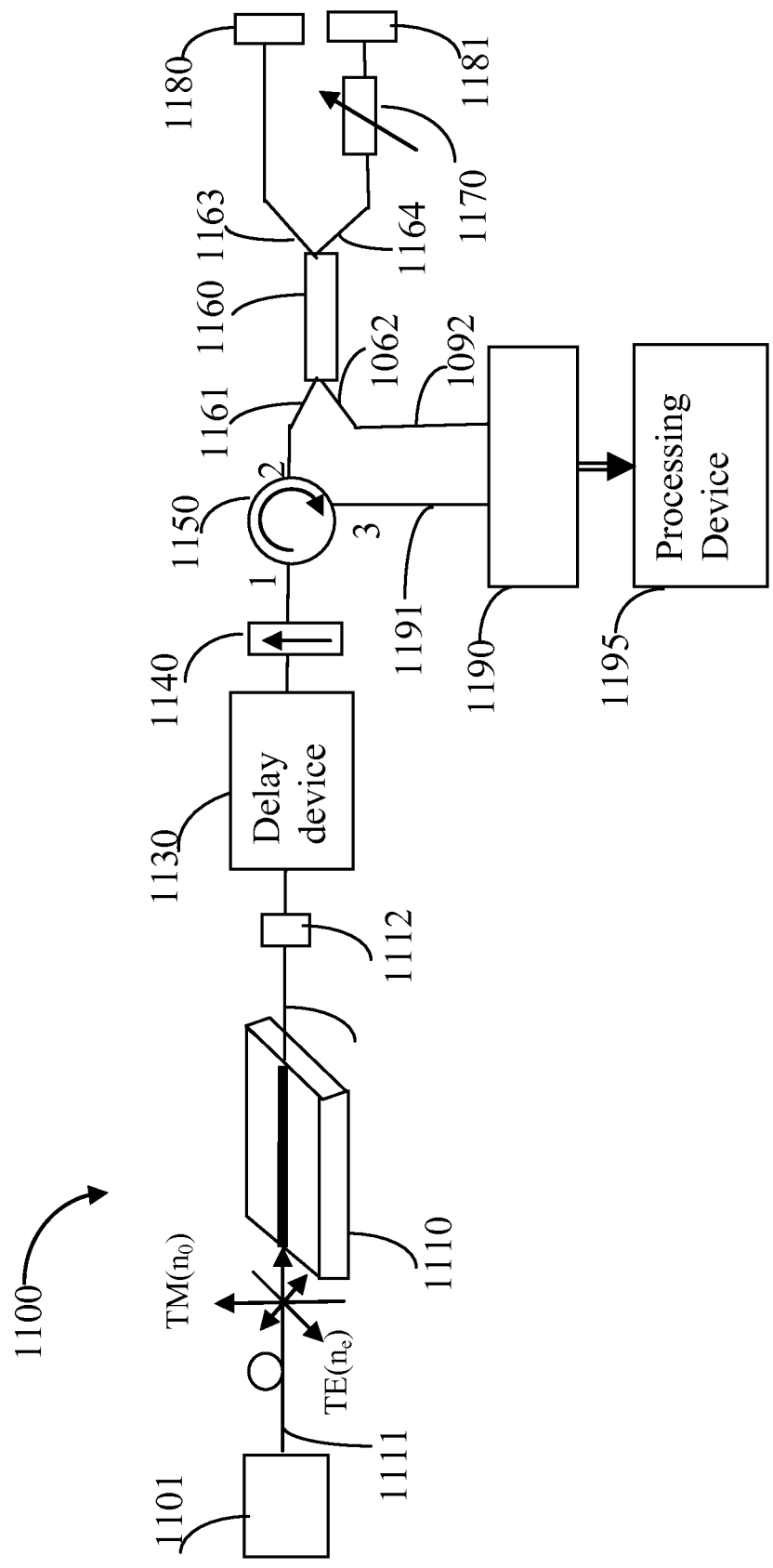
FIG. 11 shows an example of a device for measuring the attenuation ratio between two orthogonal polarization modes of light guided in a waveguide device.

FIG. 11 shows an example of a device for measuring the attenuation ratio between two orthogonal polarization modes of light guided in a waveguide device, e.g., transverse electric (TE) mode and transverse magnetic (TM) mode. In this device, a linearly polarized broadband light source 1101 is used to generate input light to enter the input fiber 1111 of a waveguide device 1110 under test, where the optical polarization of the input light to the waveguide device 1110 is aligned to make TE and TM modes of the guided light in the waveguide of the waveguide device 1110 have equal power at the input of the waveguide device 1110. After passing through the waveguide device 1110 under test, the wave packet received at input 1111 is split to two wave packet sequences which are polarized along ordinary optical axis ($n_o$, TM mode) and extraordinary optical ($n_e$ TE mode) axis, respectively. These two wave packet sequences are input to the delay device 1130 which introduces, at the output of the delay device 1130, an additional delay ΔL (greater than the delay generated by the waveguide device 1110 under test) added between two orthogonal polarization states TE and TM modes of the waveguide device 1110 under test. A 45° aligned polarizer 1140 is placed downstream from the delay device 1130 to cause these two wave packets to mix along the polarization direction of the transmission axis of the polarizer 1040. This mix of the TM and TE modes at the polarizer 1140 causes optical interference. The light output by the polarizer 1140 is input to a fiber-based optical interferometer.

This fiber-based optical interferometer is constructed as shown by the box named "fiber-based optical interferometer." The output of the polarizer 1140 is coupled to the port 1 of an optical circulator 1150 which directs the light from input port 1 to output port 2 of the circulator 1150. A 4-port fiber coupler 1160 is coupled to the port 2 at the input port 1161 of the fiber coupler 1160. The light received from the port 2 is split into separate signals at two output ports 1163 and 1164 of the fiber coupler 1160. A variable delay line 1170 is coupled to the fiber port 1164 and a Faraday mirror 1181 is coupled to the other end of the optical delay line 1170 to reflect light back. A second Faraday mirror 1180 is coupled to the fiber output port 1163 of the fiber coupler 1160 to reflect the light back. The delay between reference arm 1163 and moving arm 1164 has already been set an offset ΔL which is same as the delay generated by delay device 1130. The reflected light signals received at the ports 1163 and 1164 are spatially overlapped in the fiber coupler 1160 to produce optical inference which is contained at two output interference signals at the ports 1161 and 1162 of the fiber coupler 1160. The output interference signal at the port 1161 is directed to the port 2 of the optical circulator 1150 which directs the signal to the port 3 as the first interference signal 1191. The output interference signal at the port 1162 is directed as the second interference signal 1192.

The interference signals 1191 and 1192 can be directed into a balance detector 1010 by changing the delay of the variable delay line 1170 from zero to −Δn*l where Δn and l are birefringence and the length of waveguide under test.

Using this setup, the zero-order interference is suppressed and most of ghost peaks generated by the interference between multiple couplings are eliminated during scanning of the delay line 1170 in the interferometer. A processing device 1195 is provided to receive the output of the balanced detector 1190 and processes the data in the output to generate the measurements of the attenuation ratio between TM and TE modes of light guided in the waveguide device 1110 under test.

Based on the above described techniques and devices, a distributed polarization crosstalk analyzer can be constructed in a way to suppress or eliminate the undesired zero-order interference and to reduce the multi-coupling interference common in other interferometer devices for measuring distributed polarization crosstalk in PM fiber. In some implementations, a distributed polarization crosstalk analyzer based on present techniques and device designs can be configured as a sensing device by using the PM fiber itself as the sensing medium, eliminating the need to place multiple fiber gratings along the fiber in some grating-based sensing devices and obtaining higher spatial resolution of the stress distribution than sine grating-based sensing devices. Such a PM-fiber based sensing device has no discrete sensing elements and thus can be easy to install and calibrate, making it useful for monitoring space-resolved structural changes along bridges, tunnels, dams, oil pipes, or buildings. A distributed polarization crosstalk analyzer based on present techniques and device designs can be configured as an intrusion detection system to use mechanical disturbances to the PM fiber and the associated polarization coupling caused by an intrusion to detect the location of the intrusion. The present techniques and devices can also be used for PM fiber quality inspection for identifying defective sections of PM fiber and as a tool for detecting locations of imperfections or areas of local stress on the fiber coil induced during the fiber winding process. The software installed in the processing device in FIGS. 2A, 10 and 11 can be used to display the location and polarization coupling ratio of each stress point as a function of distance, and flags stress points with polarization coupling above a user defined trigger threshold. A quality inspection report window indicates the pass/fail status of the PM fiber or PM fiber coil, with a list of the locations and polarization coupling strengths of all stress points. Other applications of the present techniques and device designs include measuring high polarization extinction ratios of a polarizing waveguide, obtaining the autocorrelation function of a light source, measuring the birefringence of a PM fiber and the lengths of PM and SM fibers, and matching the optical path lengths of an interferometer.

Figure 12:
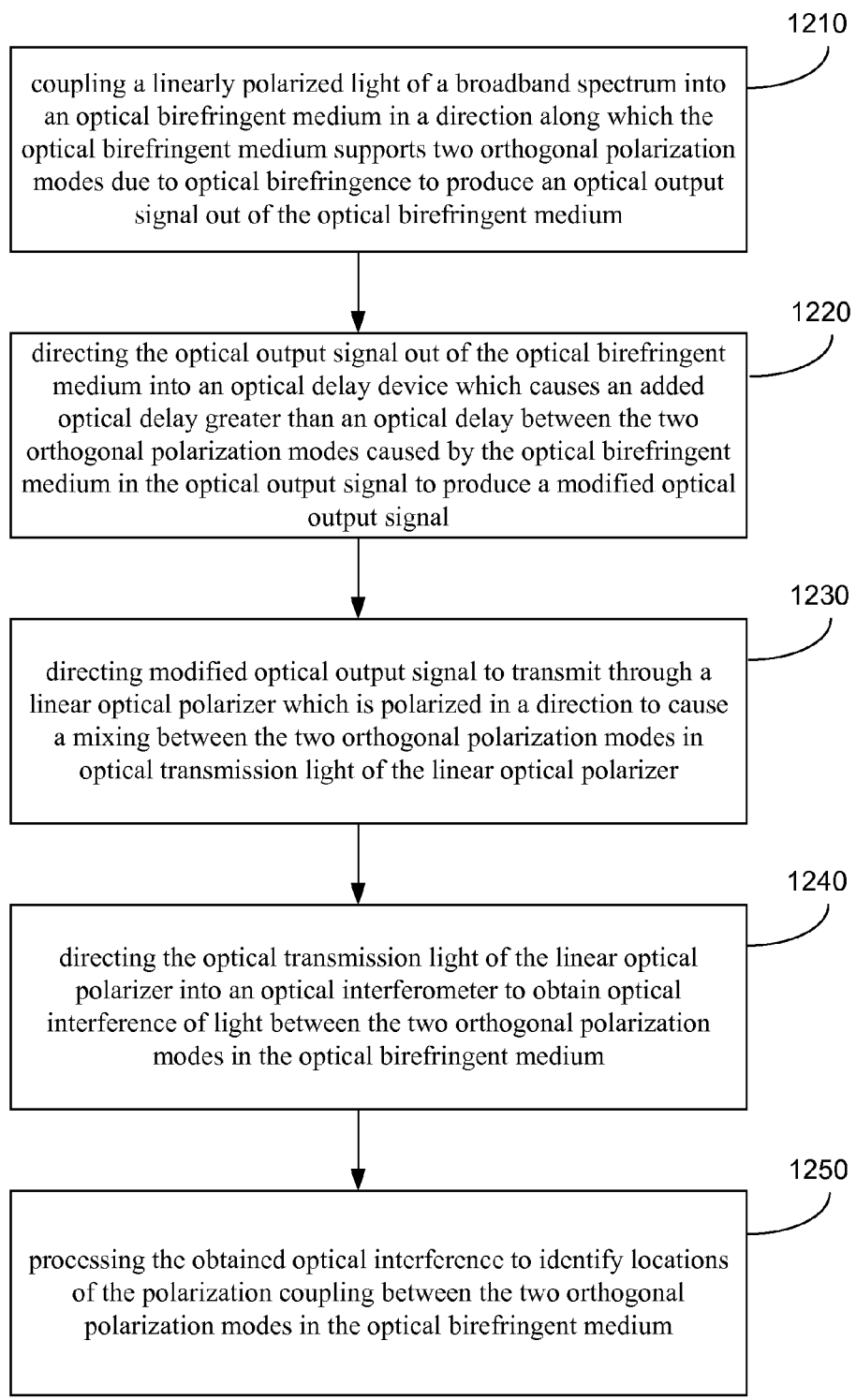
FIG. 12 shows an example of a process for measuring distributed polarization crosstalk in an optical birefringent medium such as PM fiber.

FIG. 12 shows an example of a process for measuring distributed polarization crosstalk in an optical birefringent medium such as PM fiber. Step 1210 of this process couples a linearly polarized light of a broadband spectrum into an optical birefringent medium in a direction along which the optical birefringent medium supports two orthogonal polarization modes due to optical birefringence to produce an optical output signal out of the optical birefringent medium. In Step 1220, the optical output signal out of the optical birefringent medium is directed into an optical delay device which causes an added optical delay greater than an optical delay between the two orthogonal polarization modes caused by the optical birefringent medium in the optical output signal to produce a modified optical output signal. Step 1230 of this process directs the modified optical output signal to transmit through a linear optical polarizer which is polarized in a direction, e.g., 45 degrees with respect to one of the two orthogonal polarization modes of the optical birefringent medium, to cause a mixing between the two orthogonal polarization modes in optical transmission light of the linear optical polarizer. Step 1240 of the process directs the optical transmission light of the linear optical polarizer into an optical interferometer to obtain optical interference of light between the two orthogonal polarization modes in the optical birefringent medium. At Step 1250, the obtained optical interference is processed to identify locations of the polarization coupling between the two orthogonal polarization modes in the optical birefringent medium. In addition, the obtained optical interference can be processed to obtain magnitudes of the polarization coupling at the identified locations.

The above described examples, the all-fiber device designs in FIGS. 10 and 11 can be advantageous in various applications, even without the delay device 1130 described above. The all-fiber device designs can make the device compact in size, light in weight, and robust in performance. When such an all-fiber device in FIG. 10 or 11 is implemented, the optical delay device 1130 can also be implemented based on all fiber designs such as the examples in FIGS. 5 and 8. Other fiber designs can also be used.

While this document contains many specific implementation details, these should not be construed as limitations on the scope of the invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the embodiments described above should not be understood as requiring such separation in all embodiments.

Thus, particular embodiments of the invention and their implementations are disclosed. Variations, modifications and enhancements of the disclosed embodiments and implementations and other embodiments and implementations can be made based on what is described and illustrated in this document.

What is claimed is:

1. A method for measuring distribution of polarization coupling in an optical birefringent medium, comprising:
   coupling a linearly polarized light of a broadband spectrum into an optical birefringent medium in a direction along which the optical birefringent medium supports two orthogonal polarization modes due to optical birefringence to produce an optical output signal out of the optical birefringent medium;
   directing the optical output signal out of the optical birefringent medium into an optical delay device which causes an added optical delay greater than an optical delay between the two orthogonal polarization modes caused by the optical birefringent medium in the optical output signal to produce a modified optical output signal;

directing modified optical output signal to transmit through a linear optical polarizer which is polarized in a direction to cause a mixing between the two orthogonal polarization modes in optical transmission light of the linear optical polarizer;

directing the optical transmission light of the linear optical polarizer into an optical interferometer to obtain optical interference of light between the two orthogonal polarization modes in the optical birefringent medium; and processing the obtained optical interference to identify locations of the polarization coupling between the two orthogonal polarization modes in the optical birefringent medium.

2. The method as in claim 1, comprising:
using a fiber-based interferometer as the optical interferometer.

3. The method as in claim 2, comprising:
using a fiber-based optical delay device as the optical delay device.

4. The method as in claim 1, wherein:
the optical interferometer is a free-space interferometer.

5. The method as in claim 1, comprising:
processing the obtained optical interference to obtain magnitudes of the polarization coupling at the identified locations.

6. The method as in claim 1, comprising:
processing the obtained optical interference to obtain an attenuation ratio between the two orthogonal polarizations.

7. The method as in claim 1, comprising:
the optical interferometer is a Michelson interferometer including a beam splitter that splits the optical transmission light of the linear optical polarizer into a first beam and a second beam, a fixed mirror in an optical path of the first team to reflect the first beam back to the beam splitter and a movable reflector in an optical path of the second beam to reflect the second beam back to the beam splitter so that the reflected first and second beams overlap with each other at the beam splitter to cause the optical interference between the two orthogonal polarization modes in the optical birefringent medium.

8. The method as in claim 1, comprising:
using a length of polarization maintaining (PM) fiber as the optical birefringent medium to place the PM fiber as a sensing medium for sensing stresses along a structure; and processing the obtained optical interference to measure a stress distribution of the structure.

9. The method as in claim 8, wherein:
the structure is a bridge.

10. The method as in claim 8, wherein:
the structure is a tunnel.

11. The method as in claim 8, wherein:
the structure is a dam.

12. The method as in claim 8, wherein:
the structure is a pipeline or pipe for transporting a liquid or gas.

13. The method as in claim 8, wherein:
the structure is a building.

14. The method as in claim 1, comprising
using a length of polarization maintaining (PM) fiber as the optical birefringent medium; and
processing the obtained optical interference to measure a stress distribution of the PM fiber to evaluate a quality of the PM fiber.

15. A device for measuring distribution of polarization coupling in an optical birefringent medium, comprising:

a mechanism that couples a linearly polarized light of a broadband spectrum into an optical birefringent medium in a direction along which the optical birefringent medium supports two orthogonal polarization modes due to optical birefringence to produce an optical output signal out of the optical birefringent medium;

an optical delay device located downstream from the optical birefringent medium in an optical path of the optical output signal out of the optical birefringent medium to produce a modified optical output signal, the optical delay device structured to cause an added optical delay greater than an optical delay between the two orthogonal polarization modes caused by the optical birefringent medium in the optical output signal to produce the modified optical output signal;

a linear optical polarizer which is polarized in a direction to cause a mixing between the two orthogonal polarization modes in optical transmission light of the linear optical polarizer, the linear optical polarizer placed in an optical path of the modified optical output signal to produce the optical transmission light;

an optical interferometer located to receive the optical transmission light of the linear optical polarizer and structured to obtain optical interference of light between the two orthogonal polarization modes in the optical birefringent medium; and a processing device that processes the obtained optical interference to identify locations of the polarization coupling between the two orthogonal polarization modes in the optical birefringent medium.

16. The device as in claim 15, wherein
the processing device is configured to process the obtained optical interference to obtain magnitudes of the polarization coupling at the identified locations.

17. The device as in claim 15, wherein
the processing device is configured to process the obtained optical interference to obtain an attenuation ratio between the two orthogonal polarizations.

18. The device as in claim 15, wherein
the optical interferometer is a Michelson interferometer including a beam splitter that splits the optical transmission light of the linear optical polarizer into a first beam and a second beam, a fixed mirror in an optical path of the first team to reflect the first beam back to the beam splitter and a movable reflector in an optical path of the second beam to reflect the second beam back to the beam splitter so that the reflected first and second beams overlap with each other at the beam splitter to cause the optical interference between the two orthogonal polarization modes in the optical birefringent medium.

19. The device as in claim 15, wherein
the optical birefringent medium includes a length of polarization maintaining (PM) fiber as a sensing medium for sensing stresses along a structure, and
the processing device is configured to process the obtained optical interference to measure a stress distribution of the structure.

20. The device as in claim 15, wherein
the optical delay device is a fiber-based optical delay device.

21. The device as in claim 15, wherein
the optical interferometer is a fiber-based optical interferometer.

22. The device as in claim 15, wherein
each of the optical delay device and the optical interferometer is a fiber-based device.

23. A device for measuring distribution of polarization coupling in an optical birefringent medium, comprising:
- a light source that produces a light beam of a broad spectral band;
- a mechanism that couples light of the light beam in a linear polarization into an optical birefringent medium in a direction along which the optical birefringent medium supports two orthogonal polarization modes due to optical birefringence to produce an optical output signal out of the optical birefringent medium;
- a linear optical polarizer which is polarized in a direction to cause a mixing between the two orthogonal polarization modes in optical transmission light of the linear optical polarizer, the linear optical polarizer placed in an optical path of the optical output signal of the optical birefringent medium to produce the optical transmission light;
- an optical interferometer made of fiber components and located to receive the optical transmission light of the linear optical polarizer and structured to obtain optical interference of light between the two orthogonal polarization modes in the optical birefringent medium;
- an optical delay device located between the optical birefringent medium and the optical linear polarizer in an optical path of the optical output signal out of the optical birefringent medium to produce a modified optical output signal that is received by the optical linear polarizer, the optical delay device structured to cause an added optical delay greater than an optical delay between the two orthogonal polarization modes caused by the optical birefringent medium in the optical output signal to produce the modified optical output signal;
- an optical detector that receives optical output of the optical interferometer and produces a detector output having information of the obtained optical interference; and
- a processing device that processes the obtained optical interference to identify locations of the polarization coupling between the two orthogonal polarization modes in the optical birefringent medium.

24. The device as in claim 23, wherein:
the optical interferometer includes:
- an optical circulator to receive the optical transmission light output by the linear optical polarizer at a first optical circulator port to direct the received light at the first optical circulator port to a second optical circulator port, and to direct light received at the second optical circulator port to a third optical circulator port;
- a fiber coupler having a first fiber coupler port coupled to the second optical circulator port, a second fiber coupler port, a third fiber coupler port, a fourth fiber coupler port;
- a first fiber coupled to the second fiber coupler port to receive a first portion of the light received by the first fiber coupler port from the second optical circulator port;
- a first Faraday mirror coupled to the first fiber to reflect light in the first fiber back to the second fiber coupler port along the first fiber;
- a second fiber coupled to the third fiber coupler port to receive a second portion of the light received by the first fiber coupler port from the second optical circulator port;
- a second Faraday mirror coupled to the second fiber to reflect light in the second fiber back to the third fiber coupler port along the second fiber, wherein the fiber coupler mixes and overlaps reflected light received at the second fiber coupler from the first fiber and reflected light received at the third fiber coupler form the second fiber to produce a combined light that contains the optical interference and is output at the first fiber coupler port and the fourth fiber coupler port; and
- an optical delay device coupled in one of the first fiber and the second fiber to cause an optical delay between the light in the first fiber and the second fiber;
wherein the optical detector receives light output from the third optical circulator port and light output from the fourth fiber coupler port to produce the detector output.

25. The device as in claim 24, wherein:
the optical detector is a balanced optical detector that includes two optical detectors that receive the light output from the third optical circulator port and light output from the fourth fiber coupler port, respectively.

26. The device as in claim 23, wherein the optical birefringent medium includes a length of polarization maintaining (PM) fiber as a sensing medium for sensing stresses along a structure, and the processing device is configured to process the obtained optical interference to measure a stress distribution of the structure.

* * * * *